United States Patent [19]

Schmidt et al.

[11] Patent Number: 4,790,801

[45] Date of Patent: Dec. 13, 1988

[54] MECHANIC-HYDRAULIC ACTUATING ELEMENT FOR A BELT TIGHTENER

[75] Inventors: Dieter Schmidt, Nuremberg; Dieter Goppelt, Aurachtal, both of Fed. Rep. of Germany

[73] Assignee: INA Walzlager Schaeffler KG, Fed. Rep. of Germany

[21] Appl. No.: 177,490

[22] Filed: Apr. 4, 1988

[51] Int. Cl.⁴ .............................................. F16H 7/12
[52] U.S. Cl. ..................................... 474/110; 474/138
[58] Field of Search ............... 474/101, 109, 110, 111, 474/133–138, 113–117

[56] References Cited

U.S. PATENT DOCUMENTS 4,539,001 9/1985 Okabe ................................. 474/110
4,674,996 6/1987 Anno et al. ........................ 474/110

Primary Examiner—Thuy M. Bui
Attorney, Agent, or Firm—Bierman and Muserlian

[57] ABSTRACT

A mechanical-hydraulic actuating element for a belt tightener especially for internal combustion engines comprising a piston (11) guided in a cylinder (10) between which a spring (14) acts so that piston (11) and cylinder (10) are urged apart wherein a pressure space (19) as defined by piston (11) and cylinder (10) is separated from an oil reservoir (16) by a check valve (20) which allows the free oil passsage from the oil reservoir (16) into the pressure space (19) while the annular gap between piston (11) and cylinder (10) is dimensioned so that oil can flow under pressure which counteracts the force of the spring (14) from the pressure space (19) into the oil reservoir (16) through the annular gap, characterized in that the oil reservoir (16) is designed as a circular ring-shaped hollow space which surrounds the cylinder (10) and is defined toward the outside by a hollow cylindrical cup-shaped housing (15) which is sealed at its open end by an elastic bellows seal (29) attached to the housing (15), on the one hand, and to an element (28) connected to the piston (11), on the other hand, and the spring (14) acting between the piston (11) and the cylinder (10) is designed as a helical spring arranged in the circular ring-shaped reservoir space (16).

1 Claim, 2 Drawing Sheets

MECHANIC-HYDRAULIC ACTUATING ELEMENT FOR A BELT TIGHTENER

STATE OF THE ART

Mechanical-hydraulic actuating elements for a belt tightener for internal combustion engines including a piston guided in a cylinder between which a spring acts so that the piston and cylinder are urged apart wherein a pressure space as defined by the piston and cylinder is separated from an oil reservoir by a check valve which allows free oil passage from the oil reservoir into the pressure space while the annular gap between piston and cylinder is dimensioned so that oil can flow under pressure which counteracts the force of the spring from the pressure space into the oil reservoir through the annular gap are known from DE-OS 3,211,095 for example. The spring thereof is designed as a helical pressure spring trying to urge apart the piston and cylinder and is accommodated in the relatively small pressure space so that this spring can only have a very limited axial length.

A spring dimensioned in such a manner is hardly in a position to create the required spring force, and also has the drawback that the spring force considerably varies already upon slight changes of the spring excursion. A further drawback resides in that this actuating element is provided with a sliding seal between the piston and cylinder to prevent oil losses but such sliding seals lose at constant heat exposure their sealing properties so that oil may leak from this element after a certain period of time rendering the element useless. The exposure of the sliding seal to heat is especially increased by incorporation of the oil reservoir in the interior of the piston which considerably obstructs the heat discharge and encounters a heat buildup, particularly in the area of the sliding seal.

OBJECTS OF THE INVENTION

It is an object of the invention to provide an actuating element of this type through simple means obviating these drawbacks and allowing the accommodation of a helical spring of sufficient length, to design the oil reservoir so that a good heat discharge is guaranteed and to avoid completely the use of a sliding sealing ring.

This and other objects and advantages of the invention will become obvious from the following detailed description.

SUMMARY OF THE INVENTION

The novel mechanical-hydraulic actuating element of the invention for a belt tightener for internal combustion engines comprising a piston (11) guided in a cylinder (10) between which a spring (14) acts so that piston (11) and cylinder (10) are urged apart wherein a pressure space (19) as defined by piston (11) and cylinder (10) is separated from an oil reservoir (16) by a check valve (20) which allows the free oil passage from the oil reservoir (16) into the pressure space (19) while the annular gap between piston (11) and cylinder (10) is dimensioned so that oil can flow under pressure which counteracts the force of the spring (14) from the pressure space (19) into the oil reservoir (16) through the annular gap, is characterized in that the oil reservoir (16) is designed as a circular ring-shaped hollow space which surrounds the cylinder (10) and is defined toward the outside by a hollow cylindrical cup-shaped housing (15) which is sealed at its open end by an elastic bellows seal (29) attached to the housing (15), on the one hand, and to an element (28) connected to the piston (11), on the other hand, the spring (14) acting between the piston (11) and the cylinder (10) is designed as a helical spring arranged in the circular ring-shaped reservoir space (16). Certainly, the bellows seal may be connected directly to the piston if the construction conditions permit.

Such a design has the advantage that the helical spring may have a length which corresponds almost to the overall length of the actuating element. Since the oil reservoir is arranged in the outer area of the actuating element, it is guaranteed that heat supplied to the oil during operation can be discharged toward the outside without any problems. Finally, since the sliding seal is substituted by a bellow seal, it is guaranteed that the actuating element is completely sealed against the outside even over a long operating period.

DESCRIPTION OF THE PREFERRED EMBODIMENT

Figure 1:
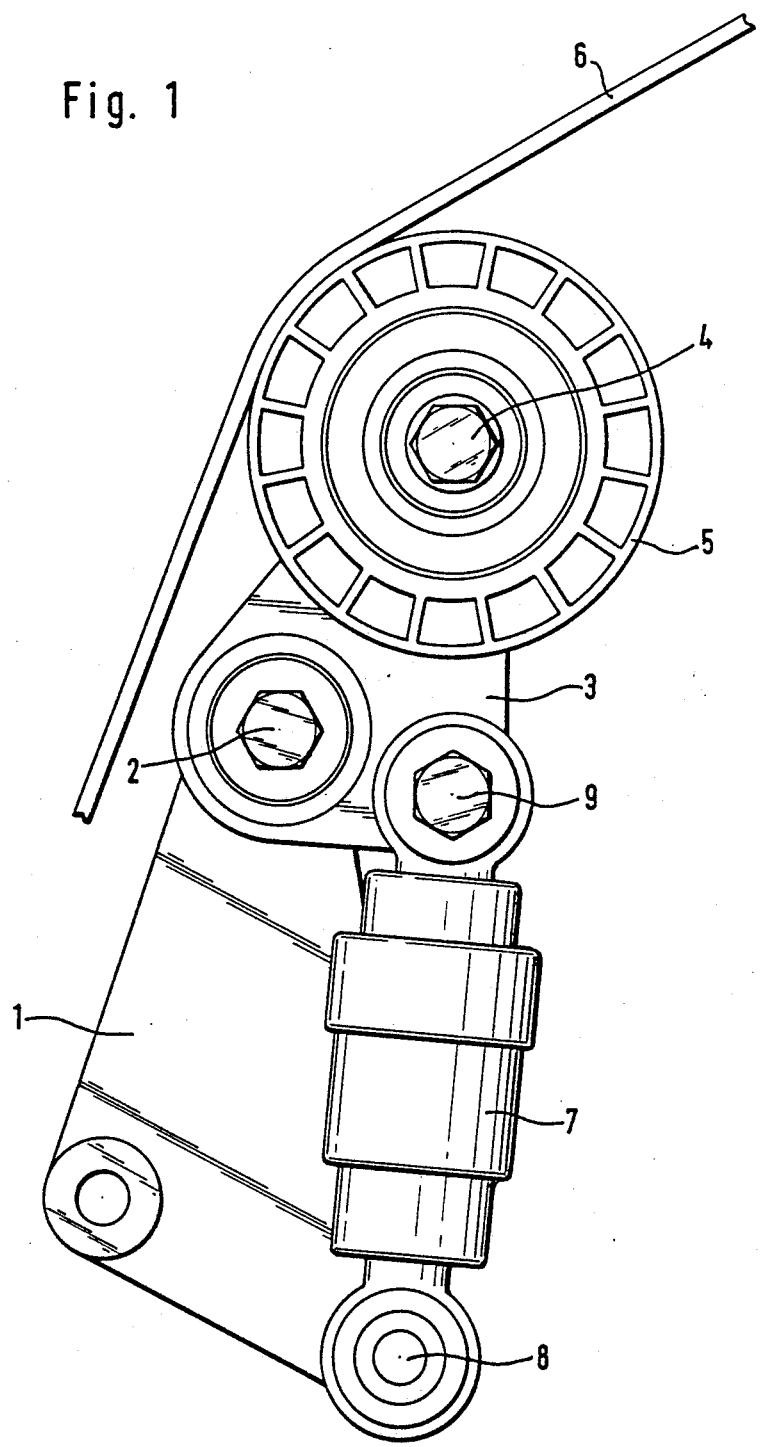
FIG. 1 is a top view of a complete belt tightener of the invention.

The belt tightener illustrated in FIG. 1 comprises a support plate 1 which supports an idler pulley lever 3 swingably mounted to a pivot 2 and the idler pulley lever 3 supports the idler pulley 5 on a rotational axis 4 which acts upon the belt 6. The tension force acting upon the idler pulley 5 is created by the actuating element 7 which, on the one hand, is attached to the pivot 8 on the support plate 1 and, on the other hand, engages the point of application 9 at the idler pulley lever 3.

Figure 2:
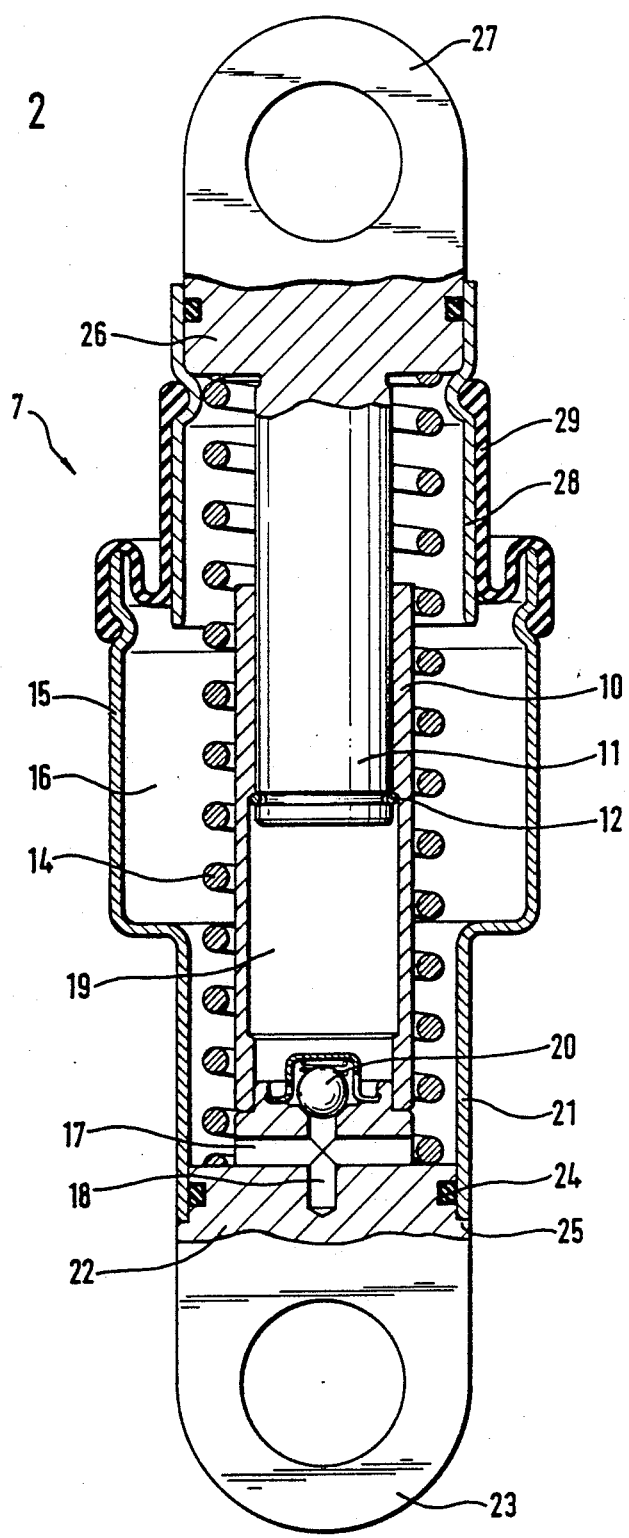
FIG. 2 is a longitudinal cross-section of the actuating element of the invention.

FIG. 2 illustrates the internal structure of the actuating element 7 which comprises a cylinder 10 guiding a piston 11 for longitudinal displacement. In a circumferential groove in proximity of its lower end, the piston 11 supports a spring ring 12 which cooperates with a shoulder in the bore of the cylinder so that the piston 11 is prevented from projecting out of the cylinder 10. Piston 11 and cylinder 10 are surrounded by a helical spring 14 which urges the piston 11 and the cylinder 10 apart and the spring is surrounded by a hollow cylindrical cup-shaped housing 15 which defines a circular ring shaped oil reservoir 16 toward the outside. The oil contained in this oil reservoir 16 can flow at the lower end thereof via a transverse bore 17 and a longitudinal bore 18 into the pressure space 19 defined by the cylinder 10 and the piston 11. A check valve 20 provided at the upper end of the longitudinal bore 18 allows the passage of the oil in the direction of the pressure space, but prevents a return flow thereof.

The hollow cylindrical cup-shaped housing 15 has at its lower end a cylindrical section 21 which surrounds the base part 22 of the cylinder 10 and the housing 15 is sealed against this base part which supports an eyelet attachment 23 by a seal 24 in a fluid-tight manner and bears against the step 25 of the base part 22. At the upper end of the piston 11 is an elongation 26 which is provided with an eyelet attachment 27 and which seals and supports a sheet metal tube 28 in the same manner as the base part 22 of the housing 15. The hollow cylindrical cup-shaped housing 15 is sealed at its upper end by an elastic seal 29 which includes at both ends thereof bead-like enlargements which engage at presstress and thus in a fluid-tight manner in circumferential grooves of the cup-shaped housing 15, on the one hand, and of the sheet metal tube 28, on the other hand.

The operation of the actuating element is such that the helical spring 14 exerts a tension force upon the idler pulley lever which acts on the idler pulley and thus on the belt. When encountering during operation irregularities in the run of the belt so that the latter exerts upon the idler pulley a force which counteracts the spring 14, the piston 11 attempts to penetrate further into the cylinder 10, but is prevented from doing so by the fluid contained in the pressure space 19. This fluid may, however, escape from the pressure space in a throttled manner via the annular leakage gap between cylinder 10 and piston 11. In this manner, blows acting upon the idler pulley by the belt are hydraulically attenuated.

Various modifications of the actuating element of the invention may be made without departing from the spirit or scope thereof and it is to be understood that the invention is intended to be limited only as defined in the appended claims.

What we claim is:

1. A mechanical-hydraulic actuating element for a belt tightener especially for internal combustion engines comprising a piston (11) guided in a cylinder (10) between which a spring (14) acts so that piston (11) and cylinder (10) are urged apart wherein a pressure space (19) as defined by piston (11) and cylinder (10) is separated from an oil reservoir (16) by a check valve (20) which allows the free oil passage from the oil reservoir (16) into the pressure space (19) while an annular gap between piston (11) and cylinder (10) is dimensioned so that oil can flow under pressure which counteracts the force of the spring (14) from the pressure space (19) into the oil reservoir (16) through the annular gap, characterized in that the oil reservoir (16) is designed as a circular ring-shaped hollow space which surrounds the cylinder (10) and is defined toward the outside by a hollow cylindrical cup-shaped housing (15) which is sealed at its open end by an elastic bellows seal (29) attached to the housing (15), on the one hand, and to an element (28) connected to the piston (11), on the other hand, and the spring (14) acting between the piston (11) and the cylinder (10) is designed as a helical spring arranged in the circular ring-shaped reservoir space (16).

* * * * *